(12) United States Patent
Fedeli

(10) Patent No.: US 9,186,015 B2
(45) Date of Patent: Nov. 17, 2015

(54) MACHINE FOR THE EXPRESS PREPARATION OF FINISHED FOODS, SUCH AS PASTA AND THE LIKE

(76) Inventor: Benedetto Fedeli, Monaco (MC)

(*) Notice: Subject to any disclaimer, the term of this patent is extended or adjusted under 35 U.S.C. 154(b) by 838 days.

(21) Appl. No.: 13/138,973

(22) PCT Filed: Apr. 8, 2010

(86) PCT No.: PCT/IB2010/000778
§ 371 (c)(1),
(2), (4) Date: Nov. 7, 2011

(87) PCT Pub. No.: WO2010/128368
PCT Pub. Date: Nov. 11, 2010

(65) Prior Publication Data
US 2012/0042786 A1    Feb. 23, 2012

(30) Foreign Application Priority Data
May 6, 2009  (IT) .............................. MO2009A0118

(51) Int. Cl.
A47J 27/00   (2006.01)
A47J 27/18   (2006.01)

(52) U.S. Cl.
CPC ............ *A47J 27/18* (2013.01); *A47J 2027/006* (2013.01)

(58) Field of Classification Search
CPC ........... F27D 11/00; A47J 27/20; A47J 37/12; A47J 37/08; A47J 27/62; A47J 27/00
USPC .......... 99/352–355, 325–333, 348, 403–418, 99/444–450, 436, 439; 219/436, 439
See application file for complete search history.

(56) References Cited

U.S. PATENT DOCUMENTS

| | | | | |
|---|---|---|---|---|
| 4,803,917 A * | 2/1989 | Barbieri | | 99/356 |
| 5,074,201 A * | 12/1991 | Takeyama et al. | | 99/483 |
| 5,215,001 A * | 6/1993 | Narcisi | | 99/357 |
| 5,363,746 A * | 11/1994 | Gordon | | 99/328 |
| 5,486,100 A * | 1/1996 | Hsu | | 425/190 |
| 6,063,421 A * | 5/2000 | Barravecchio | | 426/231 |
| 6,758,209 B2 * | 7/2004 | Takeda et al. | | 126/391.1 |
| 6,810,790 B1 * | 11/2004 | Sacca et al. | | 99/330 |
| 2001/0023642 A1 * | 9/2001 | Sanpei et al. | | 99/446 |
| 2002/0092426 A1 * | 7/2002 | Leggi | | 99/330 |
| 2002/0152896 A1 * | 10/2002 | Young et al. | | 99/330 |
| 2002/0152899 A1 | 10/2002 | Young et al. | | |
| 2003/0051606 A1 * | 3/2003 | Cusenza et al. | | 99/357 |
| 2004/0065211 A1 * | 4/2004 | McNair | | 99/348 |
| 2005/0142266 A1 | 6/2005 | Veronesi et al. | | |
| 2005/0173572 A1 * | 8/2005 | Kim | | 241/92 |
| 2005/0229789 A1 * | 10/2005 | De'Longhi | | 99/348 |
| 2006/0081653 A1 * | 4/2006 | Boland et al. | | 222/243 |
| 2006/0246188 A1 * | 11/2006 | Succar et al. | | 426/131 |
| 2008/0282905 A1 * | 11/2008 | Savage et al. | | 99/408 |

FOREIGN PATENT DOCUMENTS

WO   WO 2005/099532   10/2005

* cited by examiner

*Primary Examiner* — Dana Ross
*Assistant Examiner* — Michael Laflame, Jr.
(74) *Attorney, Agent, or Firm* — Law Offices of Steven W. Weinrieb

(57) ABSTRACT

A machine for the preparation of finished food items, such as, for example, pasta, is disclosed. The machine comprises a first receptacle within which the pasta is cooked, a second receptacle within which a pasta sauce is prepared, and a transfer structure for transferring the pasta from the first receptacle to the second receptacle such that the pasta can be mixed with the pasta sauce, all internally within the machine.

19 Claims, 8 Drawing Sheets

MACHINE FOR THE EXPRESS PREPARATION OF FINISHED FOODS, SUCH AS PASTA AND THE LIKE

TECHNICAL FIELD

The present invention relates to a machine for the express preparation of finished foods, such as pasta and the like.

BACKGROUND ART

Various types of machines are known for the preparation of single portions of pasta, some of which are described in the US patents US 20050142266 and US 20020152899.

In particular, US 20050142266 describes a method and a machine for the express preparation of "Italian" pasta dishes. The machine described therein comprises a container inside which are housed receptacles for cooking the pre-cooked pasta and outside which, is arranged a pan for heating a single-dose portion of sauce, already prepared and kept at a temperature between 0-4° C. With reference to US 20020152899, an appliance is described for the preparation and the sale of single-dose portions of pasta comprising, substantially, a chamber for cooking single-dose portions of pre-cooked pasta and a chamber containing ready-made sauce. The pasta, after cooking, is tipped onto a relevant plate which is arranged below the chamber containing the sauce. A special nozzle distributes a pre-determined quantity of sauce on the pasta.

The machines forming the subject of the two aforementioned US patents have a number of drawbacks.

Both refer in fact to the preparation of single-dose portions of pasta whereby ready-prepared ingredients are combined that do not allow ensuring a high quality of the finished dish.

Furthermore, these machines do not allow managing the quantity of pasta prepared at one time.

OBJECT OF THE INVENTION

The main object of the present invention is to provide a machine for the express preparation of finished foods, such as pasta and the like, which allows obtaining a ready-to-use end product and, at the same time, a high quality.

Another object of the present invention is to provide a machine for the express preparation of finished foods, such as pasta and the like, which has compact dimensions and is easy to service and suitable, therefore, both for professional use (catering services in general) and home use.

Not the last object of the present invention is to design a machine characterised by extensive flexibility of use, being able to operate using both fresh raw materials as such and combined with prepared or semi-finished products.

Another object of the present invention is to provide a machine that allows quickly preparing a finished dish while guaranteeing the best hygienic conditions during the preparation phase.

Another object of the present invention is to provide a machine for the express preparation of finished foods, such as pasta and the like which allows overcoming the mentioned drawbacks of the state of the art within the ambit of a simple, rational, easy, effective to use and low cost solution.

The above objects are achieved by the present machine for the express preparation of finished foods, such as pasta and the like comprising a wrapping inside which are housed at least a first receptacle for cooking the pasta and at least a second receptacle for preparing the dressing sauce of the pasta, characterized by the fact that it comprises transfer means for transferring the cooked pasta from said first receptacle to said second receptacle, the mixing of the cooked pasta with said sauce being performed directly in said second receptacle.

BRIEF DESCRIPTION OF THE DRAWINGS

Other characteristics and advantages of the present invention will become more evident from the description of a preferred, but not sole, embodiment of a machine for the express preparation of finished foods, such as pasta and the like, illustrated purely as an example but not limited to the annexed drawings in which.

EMBODIMENTS OF THE INVENTION

Figure 1:
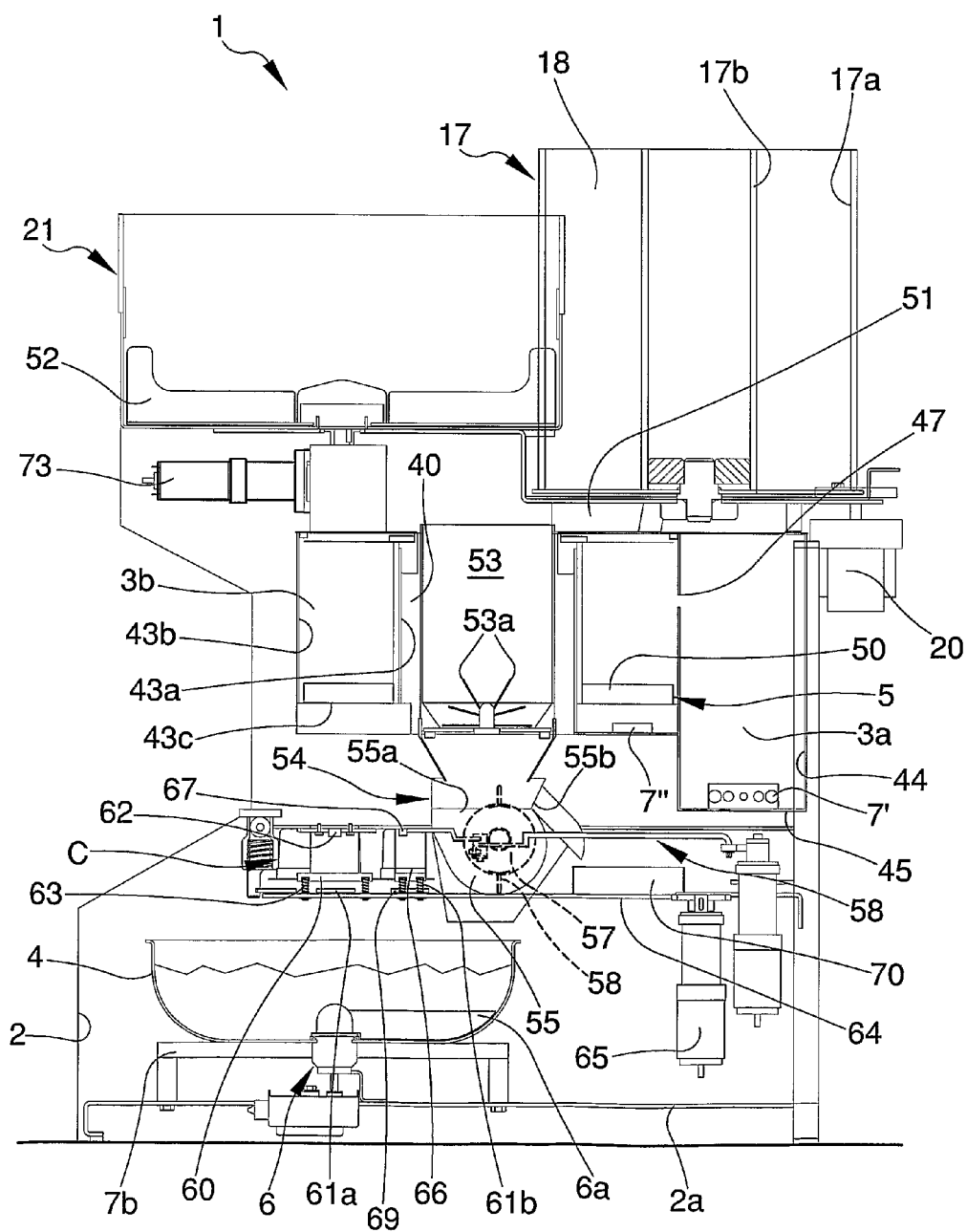
FIG. 1 is a raised side view of the machine according to the invention in a preferred embodiment.

With particular reference to such figures, globally indicated by 1 is a machine for the express preparation of finished foods, such as pasta and the like.

For simplicity of representation, the above-listed illustrations show all the elements characterising the machine according to the invention and only a part of the remaining elements, these being of known type.

The machine 1 comprises a wrapping 2 inside which is positioned at least a first receptacle 3 for cooking the pasta and at least a second receptacle 4 for preparing the pasta dressing sauce.

The wrapping 2 is externally associated with a supporting frame 2a.

Advantageously, the first receptacle 3 comprises at least a water container 3a for cooking and at least a pasta container 3b for the pasta to be cooked.

Preferably, the machine 1 comprises supply means 12 for supplying the water inside the water container 3a.

The machine 1 can also comprise pasta stirring means, suitable for preventing the pasta, during cooking, from attaching to the walls of the pasta container 3b, which means can be of the air or mechanical type.

More in particular, the stirring means can be of the air type and comprise, e.g., at least a nozzle positionable inside the first receptacle 3 in correspondence to its bottom and suitable for emitting air under pressure to cause a gurgling in the cooking water that agitates the pasta.

Alternatively, the stirring means can be of the mechanical type, e.g., comprising at least a rotating stirrer arranged inside the pasta container 3b and which can be lifted with respect to this.

The machine 1 also comprises heating means 7',7", 7a of at least one between the water container 3a and the pasta container 3b.

According to the invention, the machine 1 comprises transfer means 5 for transferring the cooked pasta from the first receptacle 3 to the second receptacle 4, in such a way as to allow amalgamating over the heat ("mantecare") the cooked pasta with the sauce just prepared directly in the second receptacle 4. The transfer means 5 can be started automatically, i.e., timed according to a cooking time preset in a control unit, or manually, i.e., selected by an operator by means of a push-button control panel.

Preferably, the machine 1 comprises mixing means 6 suitable for mixing the sauce to be prepared contained in the second receptacle 4 and for amalgamating over the heat the cooked pasta and the sauce together during subsequent mixing. Such mixing means 6 comprise at least a mobile stirrer 6a rotating inside the second receptacle 4 and moved by a motor 6b.

The stirrer 6a can be lifted with respect to the second receptacle 4 so as to allow the removal of the second receptacle itself from the wrapping 2.

Suitably, the machine 1 comprises differentiated and independent heat sources for the first and the second receptacles 3 and 4.

More particulararly, the machine 1 comprises heat administration means 7b to the second receptacle 4, independent and distinct from the heating means 7',7", 7a.

The heat administration means 7b are composed e.g. of a heatable plate arranged below the second receptacle 4.

Advantageously, the machine 1 further comprises dosing means of the pasta and/or of at least a raw material for preparing the dressing sauce.

The dosing means comprise at least a first hopper 17 for the containment of the pasta to be cooked, which can be connected to the first receptacle 3. More in particular, the first hopper 17 is arranged above the pasta container 3b.

Preferably, the machine 1 comprises two first hoppers 17.

Each first hopper 17 has one or more compartments 18, each of which is suitable for containing a preset quantity of pasta to be cooked, and a relevant bottom wall 18a having at least an opening 51 (shown only in the FIG. 1) for transferring the pasta into the pasta container 3b below.

Suitably, the compartments 18 are moving in rotation with respect to the relevant bottom wall 18a so they can be selectively moved in correspondence to the respective opening 51. More in particular, the bottom wall of the first hoppers 17 is fixed, while its external walls 17a and the internal walls 17b, separating the compartments 18, are moving in rotation.

The first hoppers 17 are driven in rotation e.g. by respective motors 20.

Preferably, the dosing means also comprise at least a second hopper 21 containing at least a raw material for the preparation of the dressing sauce and which can be connected to the second receptacles 4.

The raw material contained in the second hopper 21 can, e.g., be made up of raw tomatoes, peeled tomatoes, tomato purée, tomato sauce, tomato pulp, tomato concentrate or the like.

The machine 1 then comprises conveying means 27 of the raw material contained in the second hopper 21 into the second receptacle 4 or into an intermediate receptable 23.

Advantageously, the machine 1 according to the invention comprises at least a housing seat 31 for at least a pod C containing one or more raw materials for the preparation of the pasta dressing sauce. The pod C can contain a raw material complementary to that contained in the second hopper 21, e.g., oil, wine and/or spices, or the same raw material already worked, e.g., tomato purée, sauce, pulp or concentrate.

The pods C can be made of a thermoformed plastic wrapping closed by means of a liftable and/or removable plastic film.

The machine 1 then comprises opening means of the pod C suitable for making available the contents of the pod itself for the preparation of the sauce.

The machines 1 according to the invention can therefore be equipped both with the second hopper 21 for containing the fresh raw material and with the housing seat 31 of the pods C, the latter containing other raw materials that can be used in combination with those contained in the second hopper 21 or alternatively the one to the others.

Alternatively, embodiments cannot be ruled out wherein the machine 1 has just one between the second hopper 21 and the housing seat 31 of the pods C.

Advantageously, the wrapping 2 has one or more opening doors, not shown in the illustrations, defined in correspondence to the second receptacles 4 to allow extracting the latter at the end of the amalgamating over the heat of the cooked pasta with the prepared sauce. Such opening doors are, preferably, of the transparent type, so that the consumer can assist in the preparation of the pasta dish in real time.

Depending on the quantity of pasta, the second receptacles 4 can themselves represent the single dishes or, alternatively, the common dish to be served at table and from which the single portions can be taken.

Usefully, the machine 1 comprises means for extracting and filtering the cooking fumes associated with the frame 2a and not shown in the illustrations. Such extraction and filtering means, e.g., of the water, active charcoal type or the like, also make the machine 1 suitable for use in environments generally devoid of such devices, e.g., cafes or the like, thus allowing its variegated and flexible use.

Two particular embodiments of the machine 1 according to the invention are described here below, which are shown in the FIGS. 1 and 2 and in the figures from 3 to 8 respectively.

Figure 2:
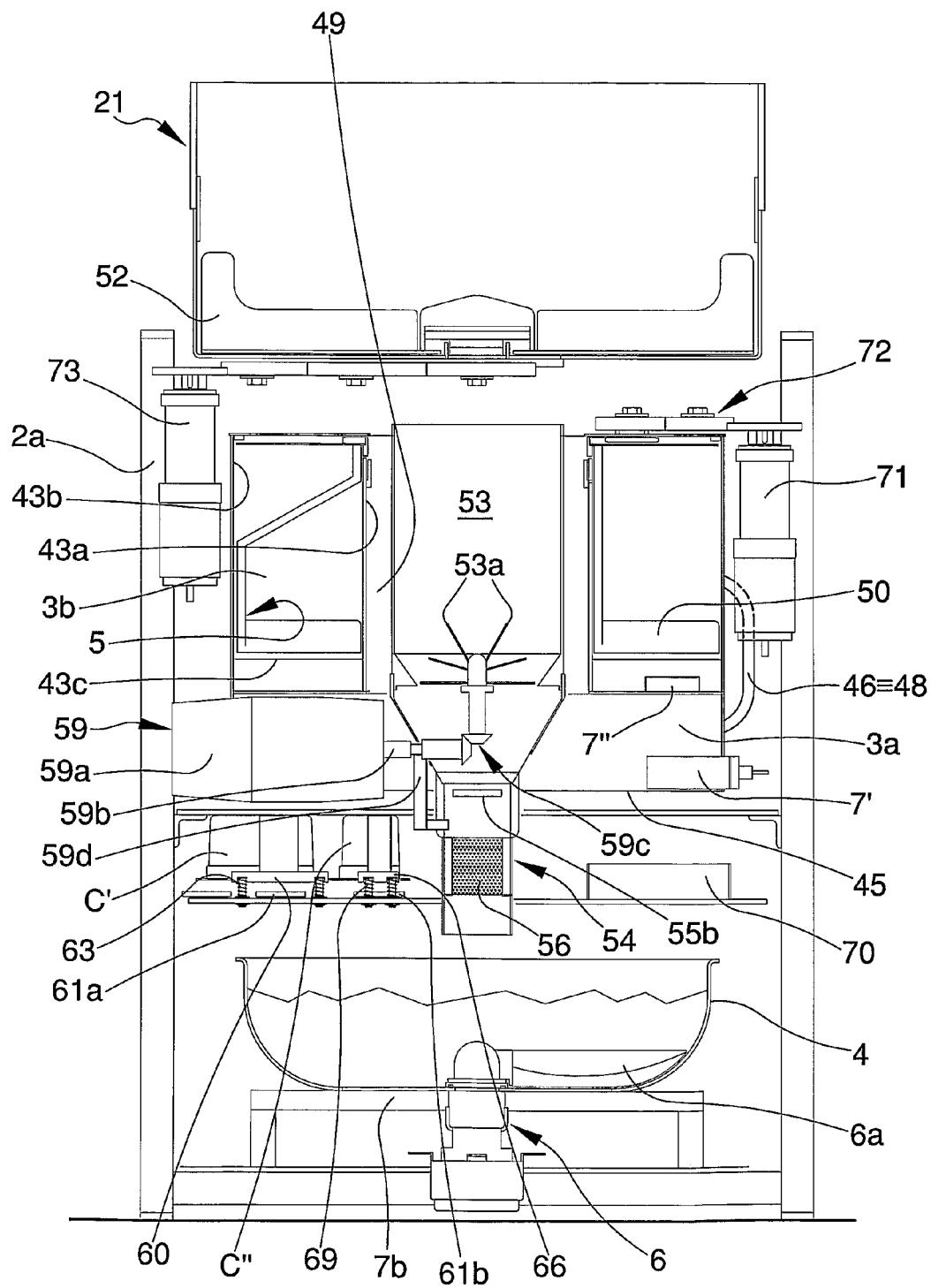
FIG. 2 is a raised front view of the machine of FIG. 1.
Figure 3:
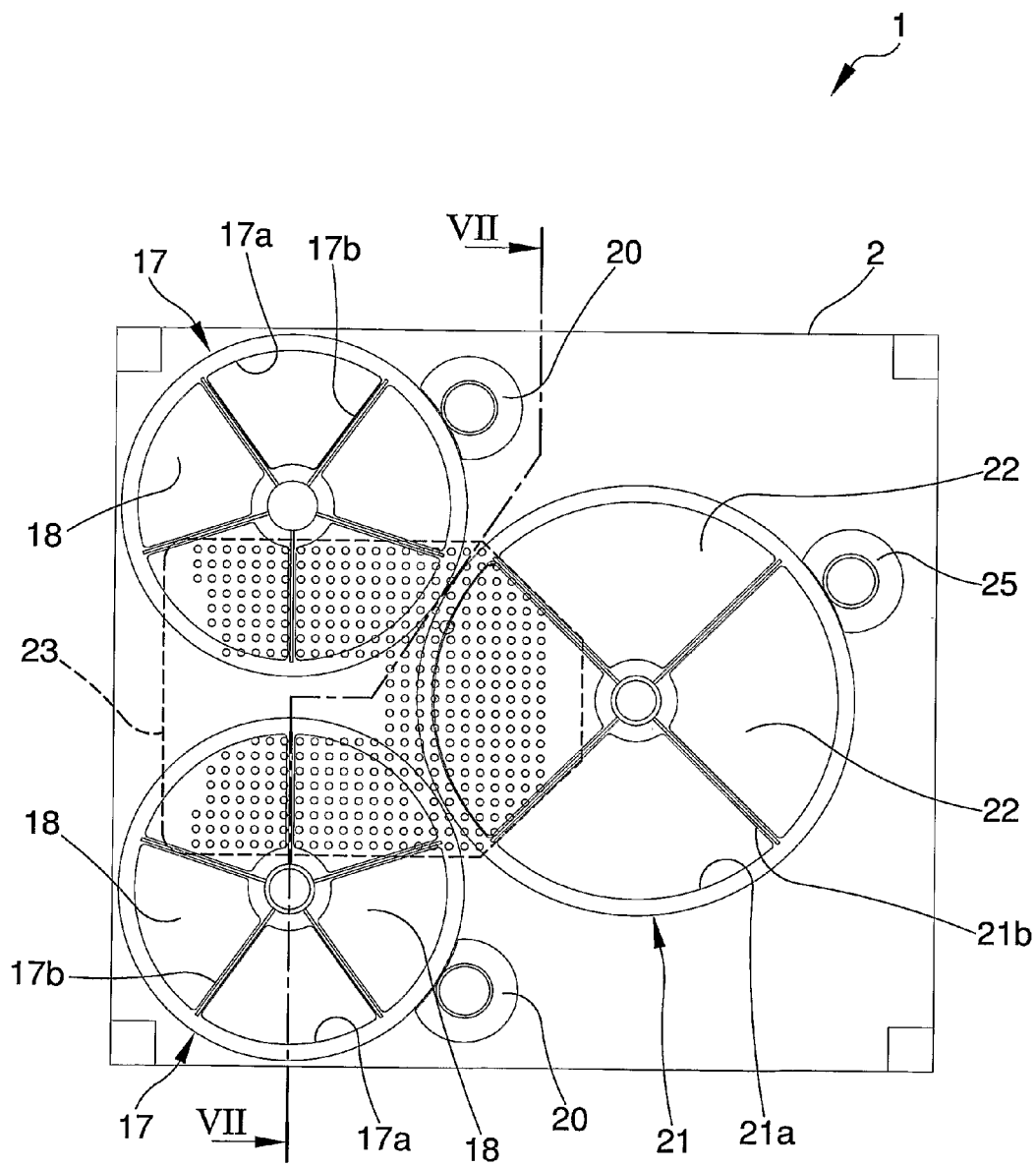
FIG. 3 is a plan top view of the machine according to the invention in an alternative embodiment.

In the first and preferred embodiment of the machine 1 shown in the FIGS. 1 and 2, the pasta container 3b has a substantially annular conformation and presents an internal side wall 43a and an external side wall 43b facing one another, where the internal side wall 43a defines an empty central area 40. The pasta container 3b is delimited below by a bottom wall 43c. The water container 3a is arranged alongside the pasta container 3b, and consequently is in part delimited at the side by a relevant side wall 44 and in part by the external side wall 43b of the pasta container 3b and below by a relevant bottom wall 45.

The bottom wall 43c of the pasta container 3b is arranged at a bigger height than the bottom wall 45 of the water container 3a.

More particularly, the heating means 7',7" comprise first heating means 7' of the water container 3a, e.g., made up of a beating element.

In the embodiment shown in the figures, the heating means 7',7" also comprise second heating means 7" of the pasta container 3b, e.g., made up of one or more heating elements.

Suitably, the second heating means 7" are arranged below the bottom wall 43c of the pasta container 3b and such bottom wall 43c is perforated so as to allow soaking the second heating means 7" in water.

In the preferred embodiment shown in FIG. 2, the machine 1 comprises first sending means 46 of the water from the water container 3a to the pasta container 3b, e.g., consisting of a pump.

Preferably, the external side wall 43b of the pasta container 3b has at least an overflow opening 47 suitable for transferring the water into the water container 3a once a preset level has been reached corresponding to the height of the overflow opening 47.

Advantageously, the machine 1 comprises removal means 48 for taking the water from the pasta container 3b suitable for removing the water at the end of the cooking phase.

More in particular, the removal means 48 are suitable for re-circulating the water taken from the pasta container 3b inside the water container 3a.

In the embodiment shown in FIG. 2, the first sending means 46 coincide with the removal means 48 and comprise, e.g., a two-directional pump not shown in detail in the illustrations.

Suitably, the water supply means, not shown in the FIGS. 1 and 2 for the sake of simplicity, are operatively connected to a float or to a solenoid valve arranged inside the water container 3a and are suitable for introducing water inside the latter when the level drops below a preset value. The water level in correspondence to which the supply means are started is obviously below the height of the overflow opening 47.

In this preferred embodiment, the transfer means 5 comprise at least an unloading area 49 defined on the pasta container 3b and movable between a closed position in which it prevents the pasta from coming out, and an open position, in which it allows the pasta to come out.

More in particular, the unloading area 49 is defined in correspondence to the bottom wall 43c of the pasta container 3b and comprises, e.g., an operable door not visible in detail in the figures.

Suitably, the second receptacle 4 is arranged below the pasta container 3b, and so the cooked pasta falls inside the second receptacle itself by gravity.

Advantageously, the transfer means 5 also comprise at least a mobile transfer element 50 inside the pasta container 3b to allow the cooked pasta to fall through the unloading area 49 with the latter in open position. The transfer element 50 is therefore equipped with rotary motion and is placed between the side walls 43a and 43b of the pasta container 3b. The transfer element 50, e.g., driven in rotation by an electric motor 71 by means of gears 72, besides ensuring easier transfer of the pasta into the second receptacle 4, also allows moving the same during the cooking phase.

As FIG. 1 shows, the first hoppers 17 (only one is shown in FIG. 2) are arranged above the pasta container 3b and can be connected to it by effect of the rotation of the relative compartments 18.

More in particular, the openings 51 defined on the bottom wall of the first hoppers 17 face directly the pasta container 3b underneath.

In this embodiment, the second hopper 21 comprises a single container having an exit mouth of the raw material and comprises movement means 52 for moving the raw material, consisting e.g. of a pair of buckets moving in rotation, suitable for conveying the raw material towards the relative exit mouth. The buckets 52 are driven in rotation by a relative motor 73, arranged in two different positions in the FIGS. 1 and 2.

In this embodiment, the conveying means 27 comprise extraction means 53,54 for extracting the pulp from at least one raw material, such as a vegetable or a fruit.

More in particular, the extraction means 53,54 comprise at least a chopping device 53 for chopping the raw material and at least a filtering device 54 for filtering the raw material ground by the chopping device itself.

Suitably, the chopping device 53 is arranged in the central area 40 defined by the internal side wall 43a of the pasta container 3b and comprises an inlet opening for the raw material substantially facing the exit mouth of the second hopper 21 and an exit opening of the ground raw material connected to the filtering device 54. The chopping device 53 comprises chopping means 53a consisting e.g. of one or more blades moving in rotation around a relevant axis. The filtering device 54, arranged below the chopping device 53 and above the second receptacle 4, comprises at least a filtering chamber 55 and filtering means 56,57 for filtering the raw material arranged inside the filtering chamber itself. The filtering chamber 55 has at least an inlet opening 55a for the chopped raw material and at least an exit opening 55b for the solid part of the filtered raw material.

More in detail, the filtering means 56, 57 comprise a filtering wall 56 and at least a rotor element 57 suitable for pressing the chopped raw material against the filtering wall 56.

More in detail, the exit opening 55b is arranged substantially opposite the inlet opening 55a with respect to the rotor element 57.

The filtering wall 56 substantially defines the bottom of the filtering chamber 55 and has a plurality of meshes suitable for allowing the flow of the juice and pulp of the chopped raw material and not of its solid part.

Preferably, the filtering wall 56 is curved.

The rotor element 57, which can be operated in rotation around a substantially horizontal axis, comprises at least a bucket 58 suitable for pressing the chopped raw material coming from the chopping device 53 against the filtering wall 56, in such a way that the pulp passes through the meshes of the filtering wall itself and the solid part on the other hand remains inside the filtering chamber 55.

The rotor element 57 turns inside the filtering chamber 55 in such a way as to drag the solid part of the filtered raw material towards the exit opening 55b. More in detail, the direction of rotation of the rotor element 57 is such that the bucket 58 moves along the filtering wall 56, pressing the chopped raw material against the latter, from the inlet opening 55a towards the exit opening 55b.

The exit opening 55b is suitably arranged along the trajectory of the bucket 58, preferably in correspondence to the filtering wall 56 and, more in particular, close to one of its top extremity area.

The filtering chamber 55 and the position of the rotor element 57 inside it are such that the extremities of the bucket 58, after arriving in correspondence to the exit opening 55b, come into contact with the top edge of the exit opening itself. This way, any remains of solid material still on the bucket 58 after the crushing of the chopped raw material against the filtering wall 56 are removed from the bucket itself and conveyed through the exit opening 55b by effect of the rubbing of its extremity portion against the edge of the filtering wall 56 delimiting at the top the exit opening itself.

Advantageously, the rotor element 57 comprises elastic means not visible in detail in the illustrations, suitable for pressing the bucket 58 against the filtering wall 56, so as to ensure the crushing of the chopped raw material against the filtering wall itself.

More in detail, the filtering chamber 55 has an eccentric shape and the configuration of the filtering wall 56 and of the rotor element 57 is such that the distance between the rotation axis of the rotor element itself, and therefore between the bucket 58 and the filtering wall 56 drops during movement from the inlet opening 55a towards the exit opening 55b.

During the rotation of the rotor element 57 from the inlet opening 55a towards the exit opening 55b, the bucket 58 moves in a radial direction towards the rotation axis of the rotor element itself by effect of the reduction in available space, compressing the elastic means.

As the rotor element 57 gradually moves towards the exit opening 55b the pressure exercised by the bucket 58 against the filtering wall 56 therefore increases.

The pulp that exits from the filtering device 54 can fall directly inside the second receptacle 4 or inside a collection receptacle not shown in the illustrations.

In the embodiment of FIGS. 1 and 2, the filtering device 54 is positioned above the second receptacle 4 and the pulp exiting from the filtering wall 56 falls directly by gravity inside the second receptacle itself.

The machine 1 also comprises operating means 59 of the chopping means 53a and/or of the rotor element 57.

Suitably, as can be seen in the embodiment shown in FIG. 2, the operating means 59 are suitable for moving both the blades 53a and the rotor element 57. More in particular, the operating means 59 comprise at least an electric motor 59a having an exit shaft 59b connected to the blades 53a by means of a bevel gear pair 59c and connected to the rotor element 57 by means of a reduction gear 59d.

In this preferred embodiment, then, the machine comprises at least a housing seat 31, e.g. four housing seats 31.

Advantageously, the opening means comprise at least a first supporting element 60 of at least a first portion C' of each pod C and first cutting means 61a for opening the first portion C'.

The first supporting element 60 is movable along a cutting direction and defines at least partially the relative housing seat 31.

The first supporting element 60 is movable along the cutting direction between an idle configuration, in which it is away from the first cutting means 61a, and an active configuration, in which it is close to the first cutting means 61a with respect to the idle configuration so that the first portion C' is intercepted by the first cutting means themselves.

More in particular, the first supporting element 60 is moving in rotation around a relevant axis and the machine 1 comprises first fixed thrust means 62 suitable for cooperating with the first supporting element 60 during its rotation movement to move it from the idle configuration to the active configuration.

Suitably, the first thrust means 62, e.g., composed of a cam, are associated integral with the frame 2a and are arranged in correspondence to the second receptacle 4.

The machine 1 also comprises first contrast means 63, e.g., one or more springs, suitable for pushing the first supporting element 60 towards the idle configuration.

More in particular, the first contrast means 63 are placed in between the first supporting element 60 and a plate 64 arranged below the first supporting element 60. The plate 64 is driven in rotation by a relevant motor 65 and thus drags the first supporting element 60 in rotation.

Suitably, the first cutting means 61a are connected integral in rotation to the first supporting element 60. More in detail, the first cutting means 61a are associated with the plate 64 and are arranged below the first supporting element 60, in such a way as to cut the first portion C' by effect of the downward movement of the first supporting element itself.

The first supporting element 60 thus approaches the plate 64 moving downwards from its idle configuration towards the active configuration.

Advantageously, the opening means comprise at least a second supporting element 66 of at least a second portion C" of a relevant pod C; the second supporting element 66 is also moving along the cutting direction but is released along such direction with respect to the relevant first supporting element 60.

Just like the first supporting element 60, the second supporting element 66 partially defines the relevant housing seat 31 of a pod C and in particular defines the housing seat of the relevant second portion. C". Suitably, the second portion C" comprises raw materials different to those contained in the corresponding first portion C'.

The opening means then comprise second cutting means 61b suitable for opening the second portion C".

The second supporting element 66 is also moving along the cutting direction from a relevant idle configuration, in which it is positioned away from the second cutting means 61b, to a relevant active configuration, in which it is positioned close to the second cutting means 61b with respect to the idle configuration so that the second portion C" is intercepted by the second cutting means themselves.

The second supporting element 66 is connected integral in rotation to the relevant first supporting element 60 and the second cutting means 61b are connected in rotation to the second supporting element 66.

Suitably, the opening means also comprise second thrust means 67 movable to move the second supporting element 66 along the cutting direction from the relevant idle configuration to the relevant active configuration.

More in particular, the second thrust means 66 comprise a cam that can be operated in rotation by a lever mechanism 68 and suitable for cooperating with the second supporting element 66 when this is in correspondence to the second receptacle 4, i.e., in correspondence to the first thrust means 62.

Preferably, the machine 1 comprises second contrast means 69, e.g., one or more springs, suitable for pushing the second supporting element 66 towards the relevant idle configuration.

More in detail, the second contrast means 69 are placed in between the relevant second supporting element 66 and the plate 64. The plate 64 therefore also drags in rotation each second supporting element 66 and is arranged below this. Just like the first supporting element 60, the second supporting element 66 also moves downwards nearer to the plate 64 from its idle configuration towards its active configuration.

The first and the second supporting element 60 and 66 are therefore connected integral in rotation by means of the plate 64. The machine 1 comprises a number of first and second supporting elements 60 and 66 equal to the number of housing seats 31.

Suitably, the plate 64 also has as many openings as the number of housing seats 31 to allow the contents of the corresponding pods C to fall inside the second receptacle 4.

The first and the second cutting means 61a and 61b are, e.g., made up of one or more small blades arranged along the edge of each opening defined on the plate 64.

The plate 64 also comprises a breaking 70 for the cooked pasta to pass through and this falls from the unloading area 49 inside the second receptacle 4.

In the alternative embodiment, shown in the figures from 3 to 8, the pasta container 3b is housed inside the water container 3a and can be moved with respect to this to drain the cooked pasta in the second receptacle 4.

Preferably, the machine 1 comprises means for moving the pasta container 3b between a cooking position, in which it is moved close to the bottom of the water container 3a, and a transfer position, in which it is moved away from the bottom of the water container with respect to the cooking position to drain the cooked pasta.

Suitably, in this embodiment, at least one of the walls of the pasta container 3b is perforated to allow the water to flow out in the transfer position.

More in particular, the pasta container 3b is moving in rotation around a first rotation axis 8 and the transfer means 5 coincide with the movement means and are therefore suitable for rotating the first receptacle 3 around such axis 8.

The pasta container 3b is therefore moving in rotation around the first rotation axis 8 and the transfer means 5 are suitable for allowing the rotation of the pasta container 3b around such axis 8 to move it from the cooking position, in which it is arranged inside the water container 3a, to the transfer position, in which it is rotated with respect to the cooking position to transfer the cooked pasta inside the second receptacle 4.

Figure 7:
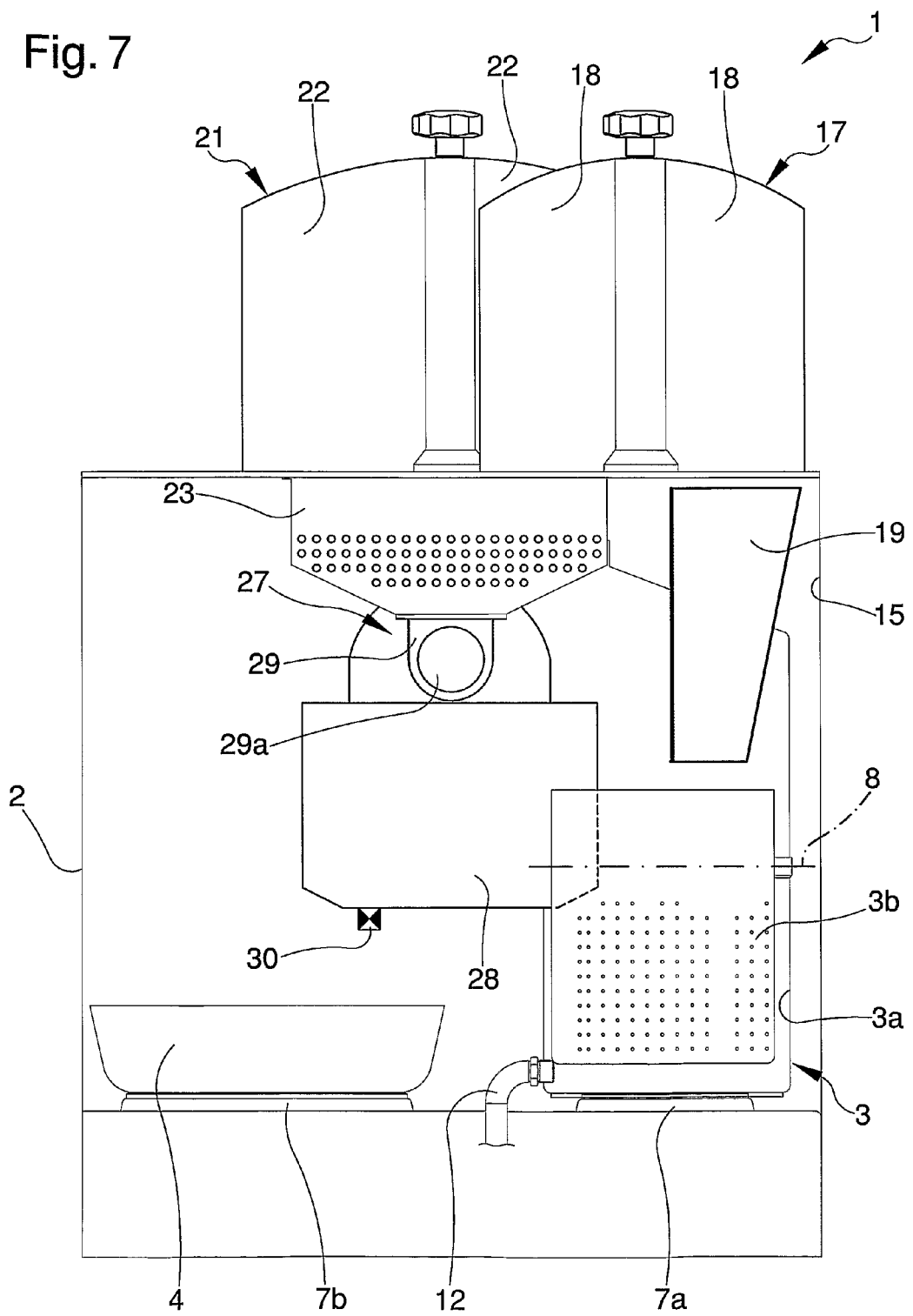
FIG. 7 is a section of the machine of FIG. 3 along the track plane VII-VII.

In the embodiment shown in FIG. 7, the first rotation axis 8 is arranged substantially horizontal.

Figure 5:
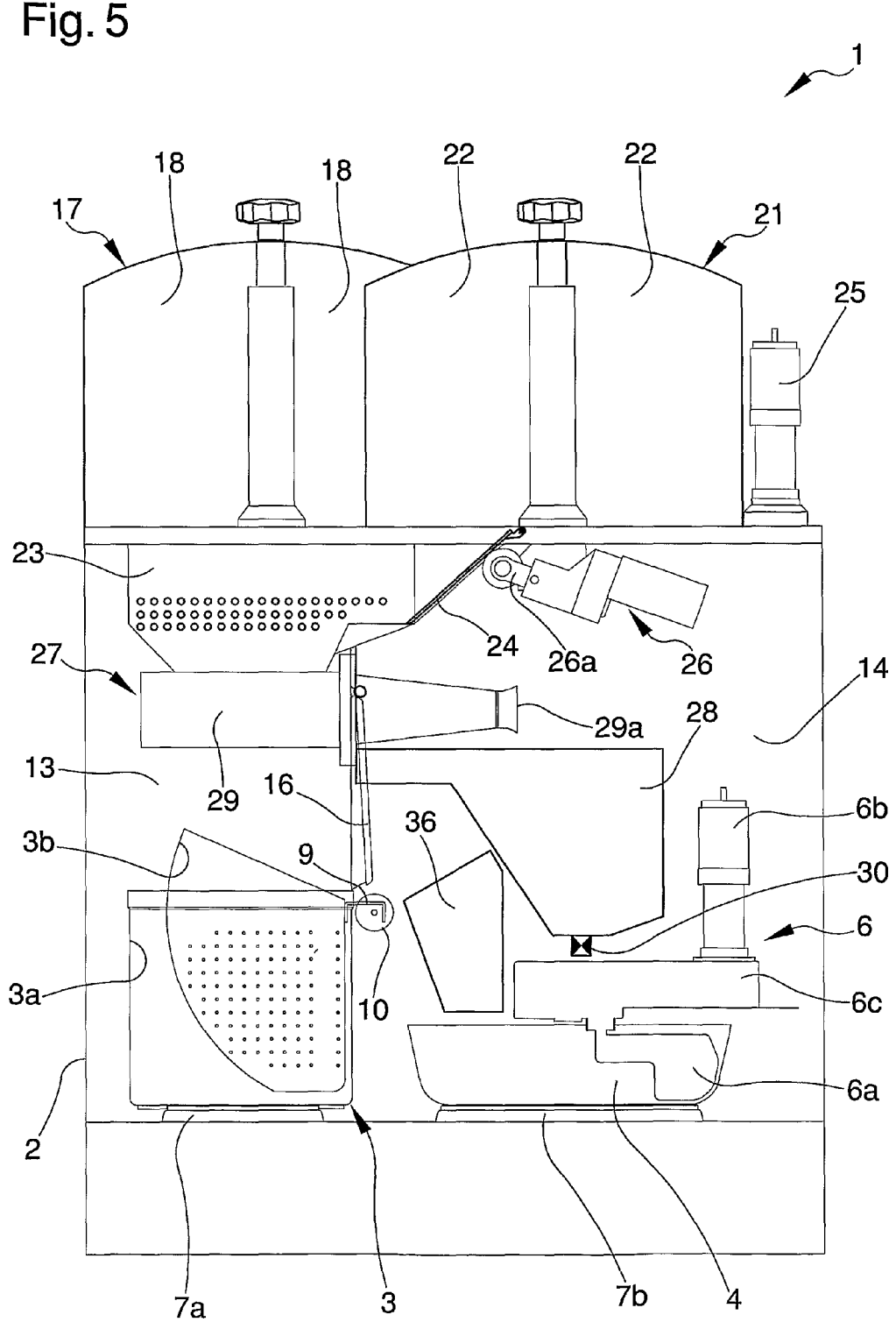
FIG. 5 is a section side view of the machine of FIG. 3, with the pasta container in cooking position.

As clearly visible in FIG. 5, the pasta container 3b is connected, by means of a substantially C-shaped connection element 9, to a revolving pin 10 rotating around the first rotation axis 8.

In this preferred embodiment, the transfer means 5 comprise at least a fluid-dynamic actuator 11 (shown in FIG. 6), e.g. of the pneumatic type, the stem 11a of which is operatively connected to the pin 10.

The start of the actuator 11 causes the rotation of the pin 10, and therefore of the pasta container 3b, around the first rotation axis 8. More in particular, the stem 11a is in extended position with the pasta container 3b in cooking position and is in retracted position with the pasta container 3b in transfer position.

Suitably, the pasta container 3b has at least a curvilinear side wall, so as not to interfere with the side walls of the water container 3a during its rotation towards the transfer position.

Alternative embodiments of the transfer means 5 cannot however be ruled out, equivalent from a functional viewpoint and comprising, e.g., cam means.

The transfer means 5 also comprise a funnel 36, arranged above the second receptacle 4 and suitable for guiding the transfer of the cooked pasta from the perforated receptacle 3b inside the second receptacle 4.

This embodiment also envisages the presence of the supply means 12 of the water inside the first receptacle 3, and in particular of the water container 3a, composed e.g. of a pipe that can be connected to a water supply utility.

In addition of the supply means 12 are also provided means of exchange of the cooking water, not illustrated, suitable for periodically removing the water from the first receptacle 3.

Usefully, after each pasta portion has been cooked, the water used can be removed by means of the means of exchange and replaced by means of the supply means 12, so as to maintain substantially constant the degree of salinity and starch of the water between the various cooking phases.

In this embodiment, the heating means 7a comprise a heatable plate arranged below the water container 3a.

Advantageously, in the alternative embodiment shown in the figures from 3 to 8, the wrapping 2 comprises a first chamber 13 inside which is housed the first receptacle 3 and a second chamber 14 inside which is housed the second receptacle 4.

The two chambers 13 and 14 are at least partially separated the one from the other by at least a partition wall 15 and by at least a dividing wall 16 swinging and openable in the switch of the pasta container 3b from the cooking position to the transfer position.

The partition wall 15 and the dividing wall 16 are suitable for preventing the steam produced by the boiling water and by pasta cooking from ending up in the environment wherein the preparation is made of the dressing sauce, i.e., in the second chamber 14.

Figure 4:
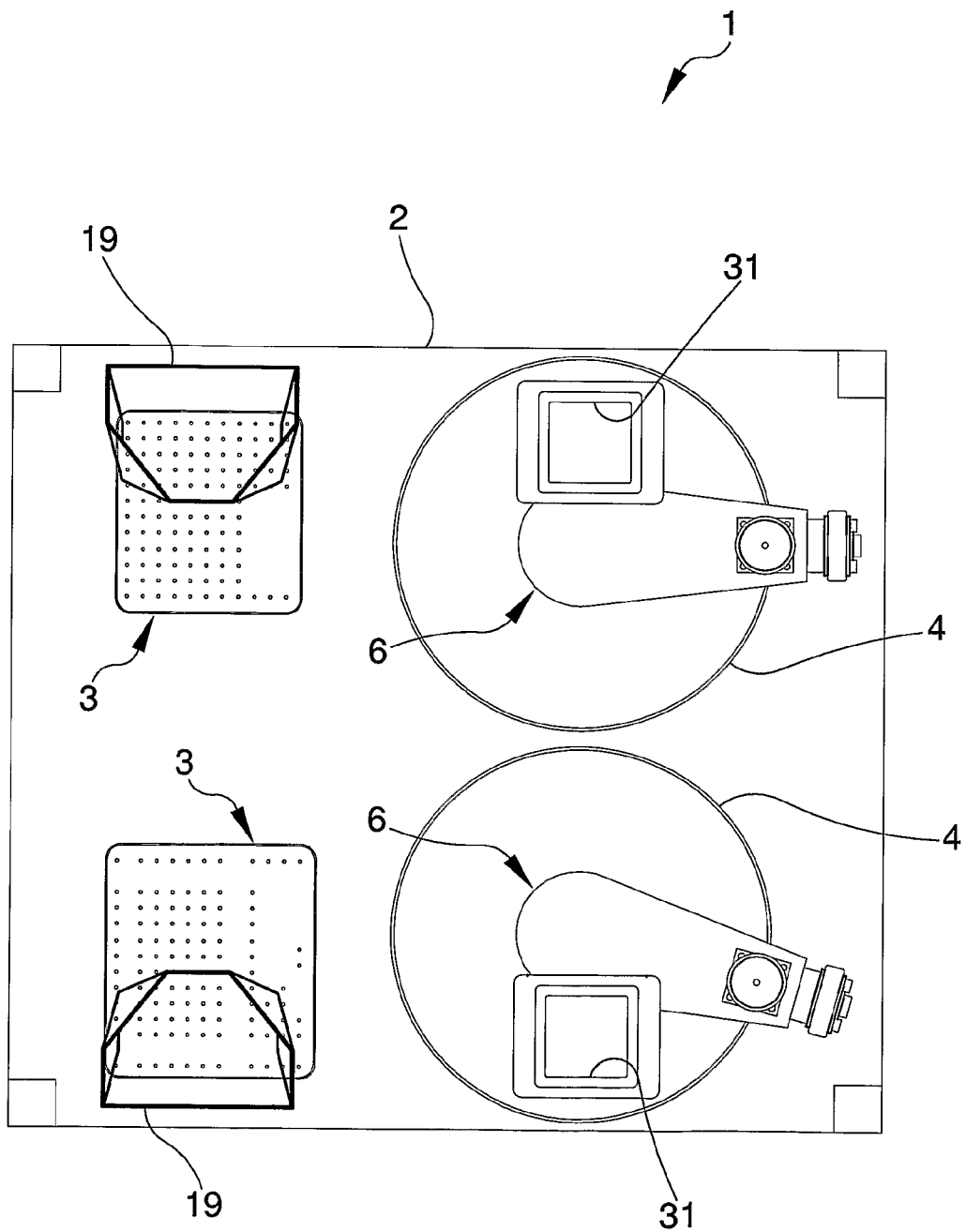
FIG. 4 is a section top view of the machine of FIG. 3.
Figure 8:
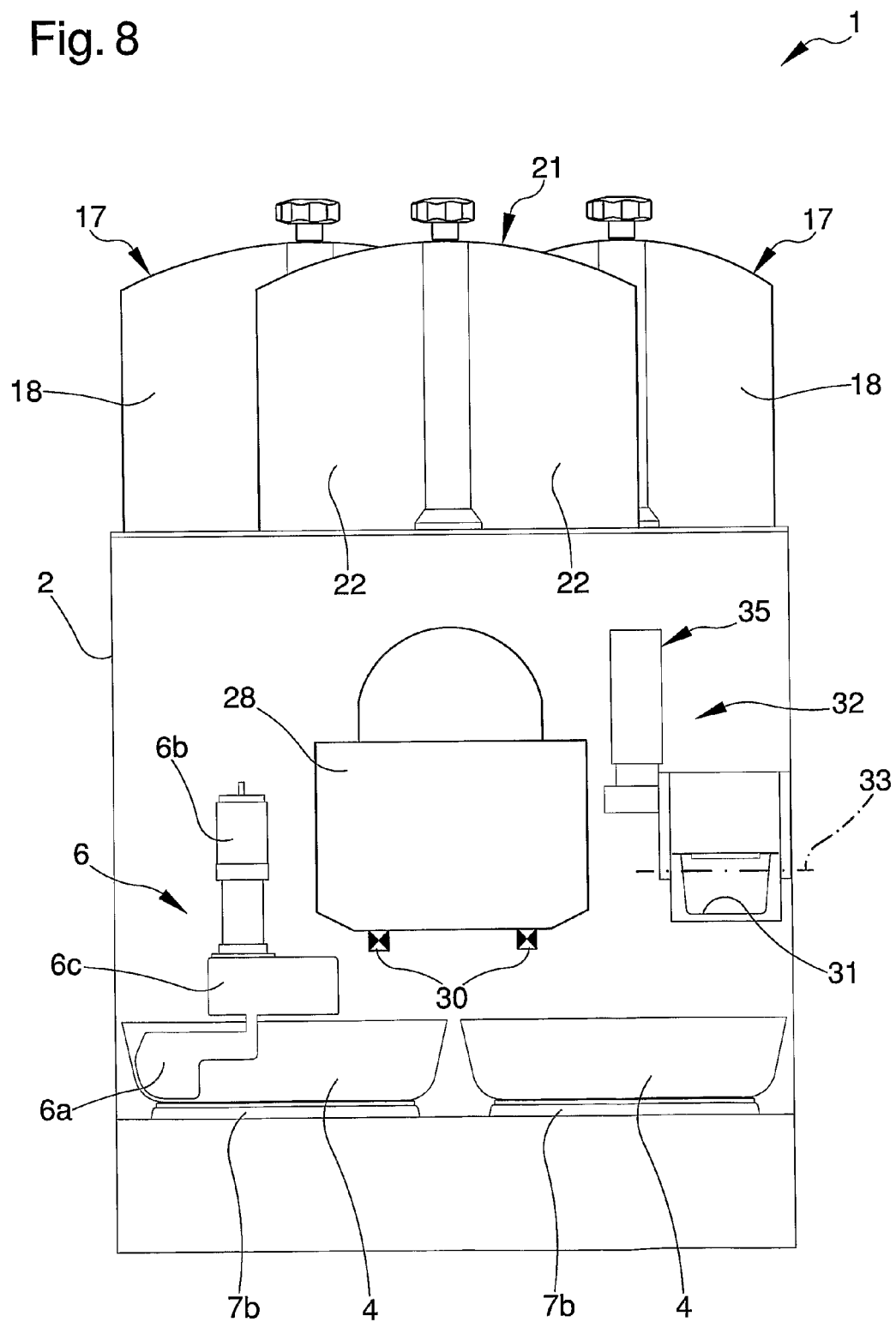
FIG. 8 is a section rear view of the machine of FIG. 3.

As is clearly shown in the FIGS. 4 and 8, the machine 1 comprises, inside the wrapping 2, two first containers 3 and two second containers 4, so as to be able to perform staggered cooking operations and/or prepare different dressing sauces at the same time.

In a further embodiment, not shown in detail in the illustrations, both the water container 3a and the pasta container 3b are substantially C-shaped and each has respective inner and outer side walls facing one another. More in particular, the water container 3a is closed at its extremities while the pasta container 3b has at least an open extremity and can be lifted with respect to the water container. The pasta container 3b is therefore contained in the water container 3a in the cooking position and is lifted with respect to it in transfer position. In this case as well, inside the pasta container 3b is arranged a mobile transfer element, suitable for conveying the cooked pasta towards the extremity of the pasta container itself and allowing it to fall into the area between such extremities. In the embodiment shown in the figures from 3 to 8, each of the first hoppers 17 can be connected to a relevant first receptacle 3 arranged below it.

More in particular, below each first hopper 17 a fixed chute 19 is arranged, suitable for conveying the pasta contained in one of the compartments 18 inside the relevant first receptacle 3.

The second hopper 21 is split into several sectors 22 each suitable for containing a specific quantity of raw material and moving in rotation with respect to the bottom of the second hopper itself.

Advantageously, the machine 1 also comprises an intermediate receptacle 23 for steam cooking the raw material contained in the second hopper 21, which can be connected to the second hopper itself and positioned between the latter and the second receptacle 4.

To convey the raw material contained in the second hopper 21 inside the intermediate receptacle 23, on the bottom of the second hopper itself a swinging door 24 is arranged.

The sectors 22 are moving in rotation around a substantially vertical axis so they can be selectively positioned in correspondence to the door 24.

More in particular, the walls delimiting the sectors 22, i.e., the outer walls 21a and the inner walls 21b, are moving in rotation around a substantially vertical axis.

The second hopper 21 is driven by a motor 25 with which it is mechanically connected, e.g., by means of gear wheels.

The door 24 is opened and closed by a fluid-dynamic actuator 26 the stem 26a of which is in extended position to keep the door 24 closed and retracts to move it to open position, so as to allow the transit of the raw material contained in the corresponding sector 22 towards the intermediate receptacle 23.

Preferably, the intermediate receptacle 23 is arranged above at least one of the first receptacles 3 and is perforated in correspondence to its side parts, in such a way as to allow the steam of the pasta cooking water to penetrate inside it.

Advantageously, the conveying means 27 are suitable for transferring the steam-cooked raw material into the intermediate receptacle 23 in at least one between the second receptacle 4 and a collection receptacle 28 (FIGS. 7 and 8) placed in between the second receptacle itself and the intermediate receptacle 23.

In the embodiment shown in the illustrations, the conveying means 27 comprise separation means 29 for separating the skin from the pulp of the steam-cooked raw material into the intermediate receptacle 23, e.g., a tomato masher (FIG. 5).

The tomato masher comprises, inside, at least a screw feeder, which also makes up the bottom of the intermediate receptacle 23 and which, when operated in rotation, drags inside it the fresh steam-cooked tomatoes.

The skin is expelled through an outlet 29a of the separation means 29, while the pulp is conveyed into the collection receptacle 28 arranged above the second receptacles 4.

In the case of the machine 1 containing a single second receptacle 4, the pulp extracted from the separation means 29 can be conveyed directly inside the second receptacle itself.

Alternatively, as shown in the FIGS. 7 and 8, the collection receptacle 28 comprises means of infusion of the pulp inside the second receptacle 4, e.g., made up of a valve 30.

Because, in the embodiment shown in the figures from 3 to 8, the machine 1 comprises two second receptacles 4, the collection receptacle 28 comprises two valves 30, suitably in a number equal to that of the second receptacles 4, to selectively convey its contents into one of the two receptacles. The valves 30, e.g., of the solenoid valve type, allow controlling the quantity of product conveyed inside each second receptacle 4.

In an alternative embodiment, not shown, the machine 1 can comprise, instead of the second hopper 21 or in addition to this, a funnel accessible from outside and suitable for conveying a raw material, e.g., mashed tomato or other vegetables, directly inside the second receptacle 4. The machine 1 can comprise a single funnel having several branches suitable for reaching the respective second receptacles 4, or a plurality of funnels separate the one from the other, of the same number as the second receptacles 4.

In this alternative embodiment, the machine 1 comprises then two housing seats 31 of relative pods C, each of which is arranged in correspondence to a relative second receptacle 4.

Suitably, the opening means of the pods C, not shown in detail in the illustrations, are positioned close to the housing seat 31 and are suitable for lifting the plastic film to make the contents of the pod C itself available.

The machine 1 comprises second sending means 32 of the contents of the pods C inside the second receptacles 4.

More in particular, each housing seat 31 is moving in rotation around a relevant second rotation axis 33 and the second sending means 32 are suitable for rotating the relevant housing seat 31 around its second rotation axis 33 to move it from a pod C receiving position to a sending position for sending its contents into the corresponding second receptacle 4.

Advantageously, each housing seat 31 has means for withholding the pod C suitable for preventing this, in the sending position, from also falling inside the second receptacle 4.

Figure 6:
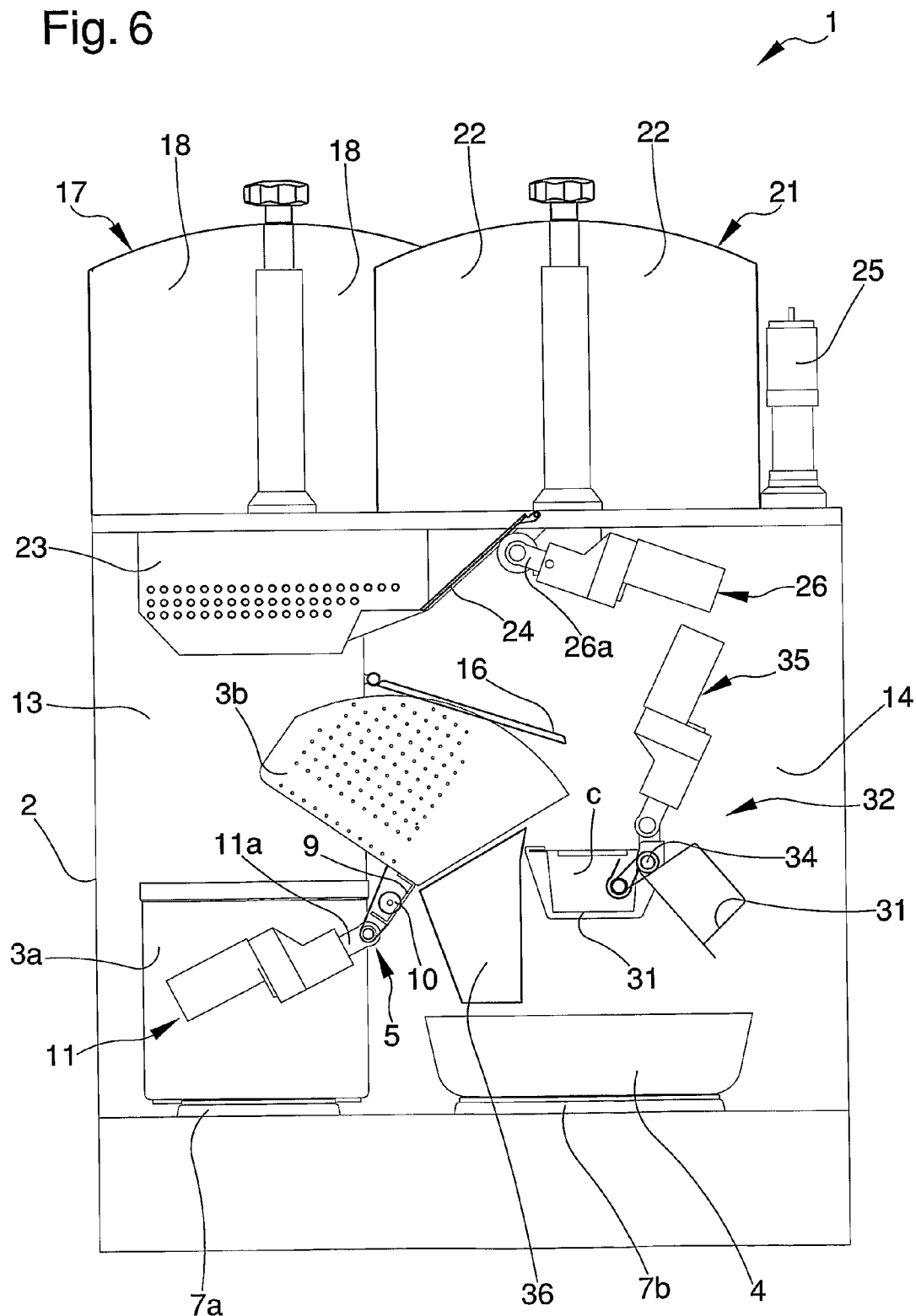
FIG. 6 is a section side view of the machine of FIG. 3, with the pasta container in transfer position.

As the FIG. 6 shows, each housing seat 31 is associated integral with a pin 34 revolving around the relevant second rotation axis 33 and the second sending means 32 comprise a fluid-dynamic actuator 35, the stem 35a of which is integrally connected to the pin 34.

The housing seats 31 are in receiving position of the capsule C with the relevant stem 35a in extended position and move towards the sending position by effect of its movement towards the corresponding retracted position.

In the embodiment shown in the figures, the second rotation axis 33 is arranged substantially horizontal.

In this embodiment, the stirrer 6a arranged inside the second receptacle 4 is driven in rotation by the motor 6b by means of movement drive means 6c, e.g., a plurality of gear wheels connected together in rotation.

For the technician in the sector, combining the characteristics described for each of the embodiments mentioned and obtaining a machine for the express preparation of finished foods which in any case falls within the protection ambit of the present invention appears banal.

A possible, but not only, operation of the machine according to the invention is the following.

The operation of the machine 1 according to the invention in the preferred embodiment shown in the FIGS. 1 and 2 is described below.

First of all, the water contained in the water container 3a is transferred and heated by the first heating means 7', inside the pasta container 3b.

The water thus transferred is kept hot by the second heating means 7".

The raw pasta is inserted inside the compartments 18 of the first hopper and the desired raw material, e.g., fresh tomatoes, is inserted inside the second hopper 21.

By effect of the rotation of the compartments 18, the raw pasta contained inside them falls into the pasta container 3b below, passing through the opening 51 defined on its bottom wall 18a.

It is preferable to leave one of the compartments 18 empty so that, during normal operation of the machine 1, such sector is kept in correspondence to the opening 51 and then rotate the remaining compartments 18 precisely when the pasta inside them has to be conveyed towards the first receptacle 3.

To prepare several portions of pasta at the same time, it is enough to rotate the compartments 18 in sequence, so as to convey the required number of portions in succession inside the first container 3.

The fall of the pasta inside the container 3b causes an increase in the water level and so the excess amount returns into the water container 3a through the overflow opening 47.

During the cooking phase, the unloading area 49 remains suitably in closed position.

At the end of the cooking phase, the water is sucked up by the pasta container 3b by means of the removal means 48 and again conveyed inside the water container 3a. Obviously, part of the water is absorbed by the pasta during cooking, and so the level inside the water container gradually drops until the relative float or the relative solendoid valve enables the supply means.

Once cooking has been completed, the unloading area 49 is moved to open position and the transfer element 50, by rotating, conveys the pasta towards the unloading area itself.

The cooked pasta then falls inside the second receptacle 4 arranged below the pasta container 3b.

The raw material contained in the second hopper 21 is guided by the buckets 52 towards its exit mouth, through which it falls inside the chopping device 53.

The operating means 59 are then enabled so as to cause the blades 53a and the rotor element 57 to rotate.

The chopped raw material exiting from the chopping device 53 then passes into the filtering device 54.

Inside the filtering device 54, the pulp of the chopped raw material is separated from the relative solid part by effect of the interaction of the buckets 58 with the filtering wall 56.

The pulp exiting from the filtering wall 56 thus falls inside the second receptacle 4 arranged below the filtering wall itself, while the solid parts exit from the exit opening 55b and are collected up in a special receptacle.

The cooked pasta and the pulp of the raw material are then both collected up inside the second receptacle 4, where the stirrer 6a mixes them and amalgamates them together over the heat.

Obviously, the cooking of the pasta and the preparation of the sauce can be done at the same time or at different times, depending on the various cooking times and the specific requirements of the case.

In case further ingredients in a pod C have to be added to the sauce, this pod C is inserted in the relative housing seat 31 and the opening means are operated. More in particular, the plate 64 is made to rotate and in its movement this also drags the first and the second supporting element 60, 66 which define the housing seat 31 of the pod C. During the rotation of the plate 64, the first supporting element 60 arrives in correspondence to the first thrust means 62. The interaction between the first supporting element 60 and the first thrust means 62 cause the first supporting element itself to move to its active configuration, i.e., approaching the plate 64.

By effect of such movement, the first portion C' supported by the first supporting element 60 makes contact with the first cutting means 61a and opens up.

The contents of the first portion C' thus fall inside the second receptacle 4 and combines with the pasta and any raw material present.

Because the embodiment of the machine 1 shown in the FIGS. 1 and 2 also permits using pods C with two portions C' and C" distinct the one from the other and containing different ingredients, after the first portion C' has been opened using the method just described, the second portion C" is also opened, keeping the pod C and therefore the relevant housing seat 31 in the same position.

More in particular, after the opening of the first portion C', the second thrust means 67 are operated in rotation, keeping the plate 64 fast in the same position. During their rotation movement, the second thrust means 67 make contact with the second supporting element 66 causing this to move towards the relevant active configuration. By effect of such movement, the second supporting element 66 approaches the plate 64 and the second portion C" makes contact with the second cutting means 61b which cause it to open and cause the relevant contents to fall into the second receptacle below.

Once terminated the interaction with the first and the second thrust means 62 and 67 respectively, the first and the second supporting element 60 and 66 return to their respective idle configurations by effect of the first and the second contrast means 63 and 69 respectively.

Because the machine 1 shown in the FIGS. 1 and 2 comprises four housing seats 31 (only one of which is visible), different types of sauces can be prepared using pods C having different contents the one from the other or else several portions of the same type of pasta can be prepared using pods C having the same contents.

Obviously, the pods C arranged in the various housing seats 31 are opened by turning the plate 64 so the relevant first supporting elements 60 are conveyed in correspondence to the first thrust means 62 and, with the plate 64 in such position, the second thrust means 67 are operated.

After pouring the contents of the pods C into the second receptacle 4, the plate 64 is returned to a neutral position, i.e., to the position corresponding to the substantial alignment between the breaking 70 defined on the plate itself and the unloading area 49 of the pasta container 3b, so as to allow the cooked pasta to fall into the second receptacle 4.

The cooked pasta thus combines with the sauce and the stirrer 6a ensures these are amalgamated together. What is more, the heat administration means 7b continue to heat the second receptacle 4 so as to allow the completion of pasta cooking and a correct mixing over the heat of same.

After the mixing over the heat phase, an operator opens the door defined on the side walls of the wrapping 2 in correspondence to the second receptacle 4 to be extracted.

Once this door has been opened and the relevant stirrer 6a raised, the corresponding second receptacle 4 can be picked up, which can be served as a single dish in the case of its containing a single portion or as a common dish in the case of the contained pasta being intended for several people.

The operation of the machine 1 as regards the alternative embodiment shown in the figures from 3 to 8 is more or less similar to that of the machine 1 described above and is indicated below.

In this case as well, the raw pasta is inserted inside the sectors 18 of the first hopper 17 and the required raw material, e.g. fresh tomatoes, is inserted inside the sectors 22 of the second hopper 21.

It is best to leave one of the sectors 18 empty so as to maintain, during normal operation of the machine 1, such sector in correspondence to the chute 19 and then rotate the remaining sectors 18 whenever the pasta contained inside them is to be conveyed towards the first receptacle 3.

The raw pasta is then conveyed by the chute 19 inside the relevant first receptacle 3, where the cooking water is located, suitably heated and brought to boil by the heating means 7a.

To prepare several portions of pasta at the same time, it is enough to rotate the sectors 18 in sequence, so as to convey in succession inside the first container 3 the raw pasta contained in it.

To prepare the pasta dressing sauce, one of the sectors 22 is positioned in correspondence to the swinging door 24 and the actuator 26 is operated so as to lower the door 24 and allow the fall of the raw material contained in the corresponding sector 22 inside the intermediate receptacle 23.

The tomatoes contained in the intermediate receptacle 23 thus start to cook by effect of the steam of the boiling cooking water contained in the first receptacle 3 underneath.

After the tomatoes have cooked, the separation means 29 are operated, i.e., the tomato masher screw feeder is operated, so as to separate the skin from the pulp.

The pulp falls by gravity inside the collection receptacle 28 positioned above the second receptacles 4, while the skin is conveyed inside a special container not visible in the illustrations.

The pulp contained in the collection receptacle 28 is then conveyed, by means of the controlled opening of the valves 30, inside the corresponding second receptacle 4, which is suitably heated by the heat administration means 7b.

At the same time, to complete the preparation of the dressing sauce, a pod C, containing oil, aromas or also the same already-worked raw material, is inserted inside the housing seat 31.

With the pod C inserted, after the opening means have removed its protective film, the relevant actuator 35 is operated so its stem 35a, moving towards the retracted position, causes the rotation of the housing seat 31 and therefore the overturning of the contents of the pod C inside the corresponding second receptacle 4.

The pod C remains inside the housing seat 31 by effect of its retention means, so it can be subsequently removed and disposed of.

If necessary, several pods C, containing different ingredients, can be inserted in succession.

Alternatively, the machine according to the invention can have a plurality of housing seats 31 for each second receptacle 4, suitable for containing an equal number of pods C.

In any case, each second receptacle 4 receives all the ingredients needed for the preparation of the sauce, both the tomato pulp or the like, contained in the collection receptacle 28, and the contents of the pod/s C.

The stirrer 6a, by means of its rotation, allows amalgamating together all the various contained ingredients.

Meanwhile, pasta cooking proceeds inside the first receptacle 3. The cooking can occur at the same time as the preparation of the sauce or in a staggered way, depending on the required preparation needs and times.

After the pasta has been cooked inside the first receptacle 3 the transfer means 5 are started so as to pour the cooked pasta inside the relevant second receptacle 4.

More precisely, the actuator 11 moves its stem 11a to retracted position thereby causing the rotation of the pin 10 and therefore of the pasta container 3b around the relevant first rotation axis 8.

As described above, the start of the transfer means 5 can be automatic, i.e., timed according to a cooking time preset in a control unit, or else manual, i.e., selectable by an operator by means of a push-button control panel.

The pasta container 3b is generally separated from the water container 3a after a time such as to obtain the "al dente" cooking of the pasta, which finishes cooking inside the second receptacle 4.

The rotation of the pasta container 3b around the relevant first rotation axis 8 results in the opening of the swinging dividing wall 16 that separates the first chamber 13 from the second chamber 14, and the overturning of the cooked pasta inside the second receptacle 4 which already contains the sauce prepared according to the previously-described procedures, passing through the funnel 36.

The cooked pasta thus combines with the sauce and the stirrer 6a amalgamates them together. Furthermore, the heat administration means 7b continue to heat the second receptacle 4 so as to allow completing the cooking of the pasta and a correct mixing over the heat of same.

After the mixing over the heat phase, an operator opens the door defined on the side walls of the wrapping 2 in correspondence to the second receptacle 4 to be extracted.

Once this door is open and the relevant stirrer 6a raised, it is then possible to take out the corresponding second receptacle 4, which can be served as a single dish in the case of its containing a single portion or as a common dish in the case of the contained pasta being intended for several people.

The machine 1 shown in the illustrations, having two first receptacles 3 and two second receptacles 4 can be exploited in different ways depending on requirements, i.e., it can allow the preparation of two recipes, different from one another, the staggered preparation of single portions or the contemporaneous preparation of several portions.

For technicians in the sector, the operation is immediately comprehensible of different embodiments of the machine according to the invention, in the case of its having only the second hopper 21 for containing the fresh raw materials for the preparation of the sauce or housing seats 31 for the pods containing the already-prepared ingredients.

It has in point of fact been ascertained how the described invention achieves the proposed objects and in particular the fact is underlined that the machine according to the invention allows preparing a complete plate of pasta in a professional way, starting with the fresh or already-prepared raw materials and also including the pasta mixing over the heat phase, essential for obtaining a top-quality dish.

Furthermore, the machine according to the invention, besides being equipped to perform all the phases required to prepare a top-quality plate of pasta, is at the same time of compact dimensions, making it suitable for both professional and home use.

Again, the machine according to the invention allows quickly preparing a top-quality plate of pasta, while at the same time maintaining stringent hygienic conditions, so as to prevent the alteration of the organoleptic properties of the finished product.

The invention claimed is:

1. A machine for the preparation of finished foods, comprising:

an enclosed housing;
a first receptacle, for cooking pasta, disposed internally within said enclosed housing;
a second receptacle, for preparing a dressing sauce for the pasta, disposed internally within said enclosed housing; and
a transfer device for transferring the cooked pasta from said first receptacle, disposed internally within said enclosed housing, into said second receptacle, disposed internally within said enclosed housing, such that mixing of the cooked pasta with the dressing sauce is performed directly within said second receptacle disposed internally within said enclosed housing.

2. The machine according to claim 1, wherein:
said machine comprises mixing structure, operatively associated with said second receptacle, for mixing the cooked pasta, transferred from said first receptacle, and the sauce contained within said second receptacle.

3. The machine according to claim 1, wherein:
said first receptacle comprises at least a water container for cooking the pasta, and at least a pasta container for the pasta to be cooked; and
heating structure for heating the water.

4. The machine according to claim 3, wherein:
said pasta container has a substantially annular configuration comprising at least an internal side wall and at least an external side wall facing one another, said internal side wall defining an empty central area.

5. The machine according to claim 3, wherein:
said transfer device comprises at least an unloading area disposed upon said pasta container and movable between a closed position at which said unloading area prevents the pasta from coming out, and an open position, at which said unloading device allows the pasta to come out.

6. The machine according to claim 5, wherein:
said transfer device comprises at least a movable transfer element inside said pasta container to allow the pasta to fall through said unloading area when said unloading area is disposed at said open position.

7. The machine according to claim 3, wherein:
said pasta container is housed inside said water container and can be moved with respect to said water container so as to drain the cooked pasta.

8. The machine according to claim 7, wherein:
said machine comprises structure for moving said pasta container between a cooking position, at which said pasta container is disposed close to a bottom wall of said water container, and a transfer position at which said pasta container is disposed away from said bottom wall of said water container and with respect to said cooking position so as to permit the cooked pasta to be drained.

9. The machine according to claim 1, wherein:
said machine comprises dosing structure for providing raw materials for the preparation of the dressing sauce.

10. The machine according to claim 9, wherein:
said dosing structure comprises at least a first hopper for containing the pasta to be cooked, wherein said first hopper is disposed above said pasta container.

11. The machine according to claim 10, wherein:
said first hopper has one or more compartments for containing corresponding portions of pasta to be cooked and a bottom wall having one or more openings for transferring the pasta into said pasta container, said compartments being movably rotatable with respect to said bottom wall.

12. The machine according to claim 9, wherein:
said dosing structure comprises at least a second hopper for containing raw materials for the preparation of the sauce.

13. The machine according to claim 9, wherein:
said dosing structure comprises conveying structure for conveyance of the raw materials into said second receptacle or into a collection receptacle separate from said second receptacle.

14. The machine according to claim 13, wherein:
said conveying structure comprises an extraction device for extracting pulp components from the raw materials.

15. The machine according to claim 14, wherein:
said extraction device comprises at least a chopping device for chopping the raw materials, and a filtering device for filtering the raw material ground by said chopping device.

16. The machine according to claim 12, wherein:
said machine comprises at least an intermediate receptacle for steam cooking the raw material coming from said second hopper.

17. The machine according to claim 1, wherein:
said machine comprises a housing seat for a pod containing one or more raw materials for the preparation of the dressing sauce of the pasta.

18. The machine according to claim 17, wherein:
said machine comprises an opening within said pod.

19. The machine according to claim 17, wherein:
said machine comprises moving structure for moving the contents of said pod from said pod to said second receptacles containing the pasta sauce.

* * * * *